United States Patent [19]
Lewis et al.

[11] Patent Number: 5,300,977
[45] Date of Patent: Apr. 5, 1994

[54] ZOOM VIEWFINDER WITH FIXED SIZE MOVING WINDOW

[75] Inventors: Alan E. Lewis, Rochester; Paul L. Ruben, Penfield, both of N.Y.

[73] Assignee: Eastman Kodak Company, Rochester, N.Y.

[21] Appl. No.: 938,798

[22] Filed: Sep. 1, 1992

[51] Int. Cl.$^5$ .............................................. B03B 13/10
[52] U.S. Cl. ................... 354/222; 359/644; 359/738
[58] Field of Search ............. 354/219, 222; 359/643, 359/644, 676, 686, 738, 739, 740, 781, 894

[56] References Cited

U.S. PATENT DOCUMENTS

| | | | |
|---|---|---|---|
| 4,725,130 | 2/1988 | Ozawa | 359/690 |
| 4,757,336 | 7/1988 | Nakayama et al. | 354/219 |
| 4,854,680 | 8/1989 | Kikuchi | 359/689 |
| 5,173,727 | 12/1992 | Lewis | 354/222 |
| 5,194,886 | 3/1993 | Mukai et al. | 354/222 |

OTHER PUBLICATIONS

Patent Abstracts of Japan; vol. 10, No. 322 (p-511) (2378) 31 Oct. 1986.

*Primary Examiner*—Richard A. Wintercorn
*Assistant Examiner*—Howard B. Blankenship
*Attorney, Agent, or Firm*—Svetlana Z. Short

[57] ABSTRACT

A compact Galilean-type zoom finder suitable for compact cameras, and the like whose zoom ratio is about 2. The zoom finder is comprised of four units having negative, negative, positive and negative refractive powers in order from an object side and a movable fixed aperture framing window. The first and the fourth lens units are fixed and the second and the third lens units are moved to perform zooming. The moving framing window helps to delineate the field of view.

7 Claims, 2 Drawing Sheets

ZOOM VIEWFINDER WITH FIXED SIZE MOVING WINDOW

CROSS-REFERENCE TO RELATED APPLICATIONS

This application is related to U.S. Ser. No. 07/783,588, filed Oct. 28, 1991, U.S. Pat. No. 5,173,727, entitled ZOOM VIEWFINDER, in the name of Alan E. Lewis.

BACKGROUND OF THE INVENTION

This invention relates to zoom viewfinders.

U.S. Pat. Nos. 4,725,130 and 4,854,680 each describe a 3-unit Reverse Galilean-type zoom viewfinder. The finders disclosed in the above-mentioned patents all have a 3 unit, minus-plus-minus configuration. In these finders, the positive lens unit always moves for zooming, while the two negative lens units generally are stationary. U.S. Pat. No. 4,725,130 also discloses that the first negative lens unit may also move for zooming.

The inherent problem with this approach is that when the above minus-plus-minus component configuration is used and only the single positive unit is moved for zooming, the zoom finder suffers from defocusing. To accommodate this defocus, the lens of the observer's eye has to constantly adjust itself as the viewfinder zooms. Although, as disclosed in U.S. Pat. No. 4,725,130, the movement of the first lens unit in conjunction with the second lens unit can rectify this problem, a design modification such as this would loose an advantage of having fixed (i.e. stationary) outer lens elements.

U.S. Ser. No. 07/783,588 shows a finder which solves many of these problems by having four lens units that are:

(a) a stationary first lens unit having negative refractive power;
(b) a movable second lens unit having negative refractive power;
(c) a movable third lens unit having positive refractive power; and
(d) a stationary fourth lens element having negative refractive power, where the second and third units are being movable for zooming.

U.S. Pat. Nos. 4,725,130 and 4,854,680 do not identify the location of the field stop. If the field stop is assumed to be the clear aperture of the front most lens element, then the value of margin for the disclosed viewfinders will not remain constant throughout the zoom range. U.S. Ser. No. 07/783,588 does not address the question of margin control either.

Reverse Galilean-type viewfinders which include a projected frame or reticle easily delineate the field of view. When we eliminate the reticle or the frame, controlling the field of view becomes more difficult. Merely changing magnification does not guarantee that as we zoom we will see the correct field of view (FOV), because the aperture (window) that limits the FOV may appear to change size resulting in a variation in the apparent FOV. Having a fixed location field stop (i.e. framing window) with a variable aperture may solve this problem, but at the expense of the system's compactness.

SUMMARY OF THE INVENTION

It is therefore an object of the present invention to control the field of view of a zoom viewfinder of the type having a plurality of elements and a field stop (or framing window).

Yet, another object of the present invention to control the field of view of a zoom viewfinder without compromising its compactness.

The above and other objects are achieved by providing a fixed aperture field stop (i.e. framing window) that is movable during zooming between two of the lens elements.

According to one aspect of the present invention, a zoom finder comprises four lens units as follows:

(a) a stationary first lens unit having negative refractive power;
(b) a movable second lens unit having negative refractive power;
(c) a movable third lens unit having positive refractive power;
(d) a stationary fourth lens unit having negative refractive power, where the second and third units are being movable for zooming; and
(e) a movable field stop (or framing window), which has a fixed size aperture and is located within the zoom finder between two lens units.

DETAILED DESCRIPTION OF THE PREFERRED EMBODIMENT

The lens system of the present invention has a general application to optical systems employing zoom viewfinders. An example of such application is a viewfinder suitable for use in compact cameras. In order to provide a concise description of the preferred embodiment, certain details of the viewfinder and camera in which it may be used are not described herein but are selectable from the prior art.

Figure 1:
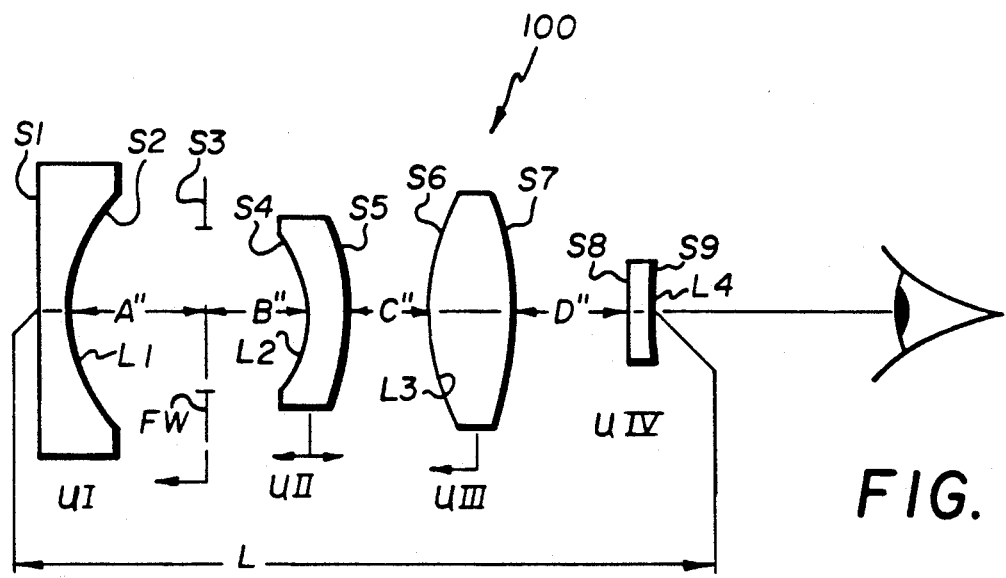
FIG. 1 is a side view of a zoom viewfinder that forms a first embodiment of the invention.

The lens system fanning the viewfinder of the first embodiment of the present invention will now be described with reference being made to the accompanying FIG. 1. The lens system 100 is characterized by an unusually large half field angle (in a wide angle mode) of 32 degrees, 2× zoom range and compactness in both length and front (object side) aperture. The viewfinder has high image quality and low distortion. The outer elements of the zoom finder are fixed in position. This is helpful for keeping dust and dirt out of the mechanism. The lens system 100 contains four optical units, these are in order from an object side, UI, UII, UIII and UIV. The lens 100 contains four airspaces A", B", C" and D" between the optical units UI, the framing window FW, the optical unit UII, the optical unit UIII and the optical unit UIV, respectively. Constant axial accommodation is achieved by use of two internal differentially moving (i.e. moving at different rates) optical units UII and UIII. Thus, as UII and UIII move relative to UI during zooming, UII also moves relative to UIII.

Following from the object to pupil location the lens units are: A negative power lens unit UI, which is stationary (i.e. it does not move for zooming); a negative optical unit UII, movable along the optical axis for zooming; a positive optical unit UIII also movable along the optical axis for zooming; and a stationary negative power optical unit UIV. The function of the front, negative optical unit UI is to expand the beam diameter as it enters the viewfinder and to correct distortion. Having the first optical unit UI and the second optical unit UII near each other allows coverage of the largest possible angle in a wide angle mode. This is done by virtue of bringing a negative unit UII from the back of the optical system towards the front of the optical system thus allowing more negative power towards the front in order to have maximum angular coverage. The positive power optical unit UIII is movable for zooming and is used for compensating for the drift in the position of the virtual image as seen by the eye of the viewer. It is located towards the rear of the optical system in order to minimize the beam diameter. Finally, having a negative rear unit UIV, rather than it being positive, permits the positive unit UIII to be made stronger, so that the optical unit UIII does not have to travel as far to achieve full zooming. In addition, the stationary unit UIV protects zooming groups from the foreign particular matter. The combination of units UIII and UIV act as an eyepiece in re-imaging the light to the eye.

More specifically, the first lens unit UI comprises a negative lens element L1 with a stronger curvature oriented towards a pupil position; the second lens unit UII comprises a negative meniscus lens element L2 with a concave surface oriented toward to the first lens unit; the third lens unit UIII comprises a positive biconvex lens element L3; and the fourth lens unit UIV comprises a negative biconcave lens element L4. All of the lens elements were made of plastic to make the production of the viewfinder relatively inexpensive. The numerical data for the optical system 100 are as follows:

TABLE I

| Surface | Clear Apertures Top-Bottom | Clear Apertures Side-Side | Radius | Thickness | Material N | Material Y |
|---|---|---|---|---|---|---|
| S1 | 8.64 | 12.59 | 469.668 | 1.500 | 1.492 | 574 |
| S2 | 6.90 | 10.08 | ASPHERE | A" | | |
| S3 | | | WINDOW | B" | | |
| S4 | 4.74 | 7.22 | ASPHERE | 1.700 | 1.535 | 405 |
| S5 | 5.37 | 8.22 | −13.6721 | C" | | |
| S6 | 6.67 | 10.38 | 12.4215 | 4.380 | 1.492 | 574 |
| S7 | 6.51 | 10.15 | ASPHERE | D" | | |
| S8 | 3.00 | 4.61 | −121.781 | 1.200 | 1.535 | 405 |
| S9 | 2.94 | 4.25 | 22.0597 | | | |
| FINDER LENGTH = 32.000 | | | | | | |

ASPHERIC EQUATION:

$$X = \frac{CY^2}{1 + \sqrt{1 - (k+1)C^2Y^2}} + DY^4 + EY^6 + FY^8 + GY^{10}$$

SURFACE S2  C = .14761       E = .12428E-05
            k = −.87442      F = −.12197E-07
            D = −.20684E-03  G = .84344E-10
SURFACE S4  C = −.16584      E = .45545E-05
            k = −1.57580     F = .69169E-07
            D = −.72436E-03  G = .15309E-10
SURFACE S7  C = −.07622      E = .11410E-05
            k = −2.67459     F = −.14805E-07
            D = .13448E-03   G = .57856E-10

ZOOM THICKNESSES:

| MAG. | A" | B" | C" | D" |
|---|---|---|---|---|
| .286 | 11.454 | 6.432 | 4.834 | 0.500 |
| .389 | 7.147 | 5.541 | 4.435 | 6.097 |
| .530 | 4.026 | 2.500 | 4.962 | 11.732 |

The space C" between the optical units II and III in the above embodiment is about 17% of the total finder length L. This appears to allow for superior performance for this type of lens system while maintaining the compactness of the overall system. The movement of UII and UIII relative to each other and to the stationary units UI and UIV provides a virtual image plane that is stationary and thus there is no need for the eye to adjust its focus as the finder is zooming. If the spacing C" between units UII and UIII is kept constant so that these inner units move together at the same rate (for simplified mechanical considerations), the axial accommodation will vary with zoom position, but the image will still be viewable.

In the optical system 100, the field of view may be controlled by the aperture of the lens element L1 in the wide angle mode of operation. The aperture of the lens element is defined by the periphery of the optically transparent portion of the lens element or an opaque wall of the element mount, whichever is smaller. In the telephoto mode, an aperture on lens element L2 may be used to control the field of view. However, in the intermediate zoom positions, one of these two limiting apertures delineates the field of view, but the apparent field of view varies from its value at the two extreme zoom positions. If accurate control of the apparent FOV is desired, a variable size aperture can be placed near the front of the viewfinder as far from the eye as possible to control the apparent field of view. However, the mechanism to change the aperture size would require the front of the viewfinder to become larger in diameter which may work against a required goal of compactness. A better way to control the apparent field of view in a reversed Galilean-type viewfinder was invented and is discussed below.

Figure 2:
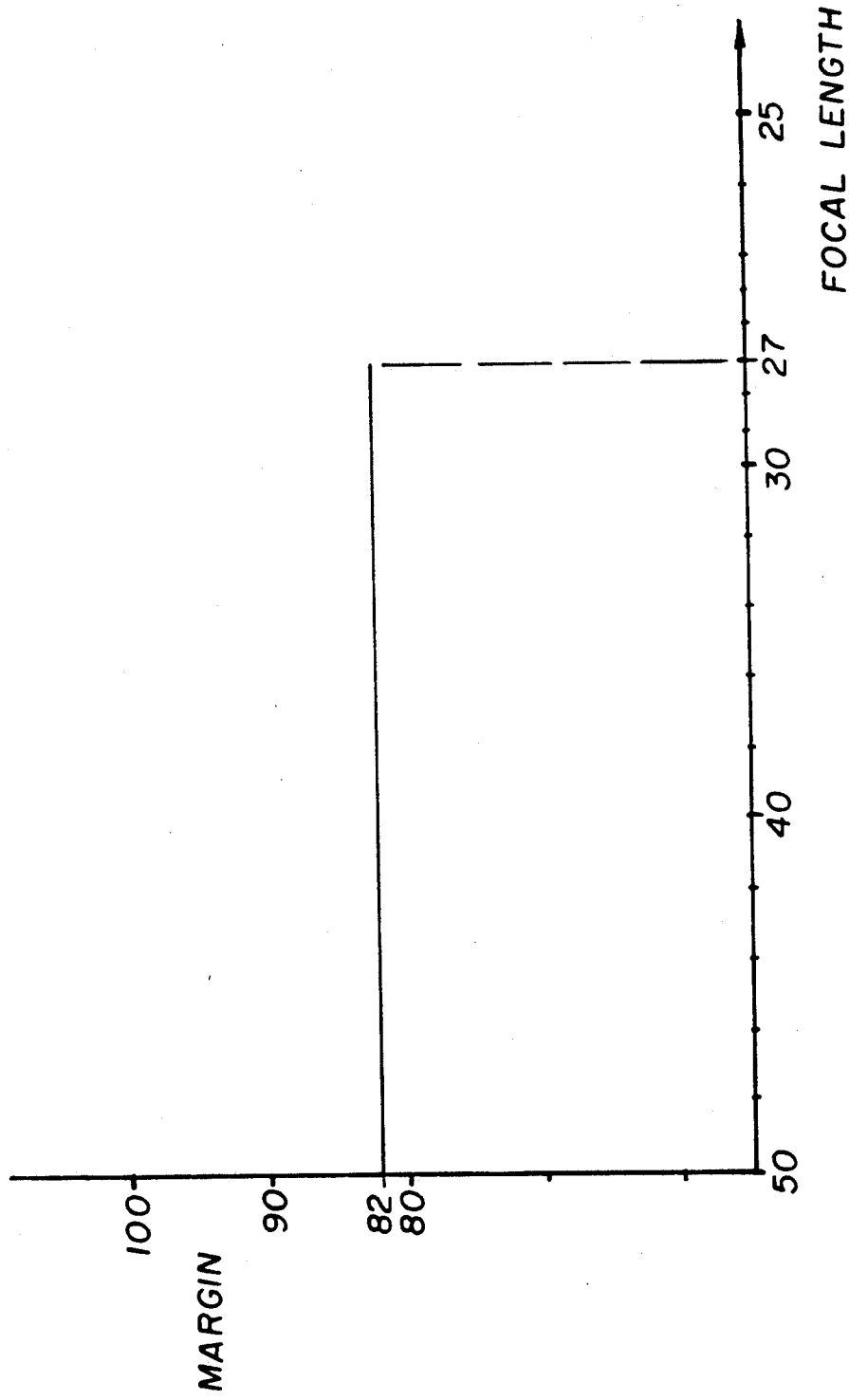
FIG. 2 shows the margin control for the side of the format of the first embodiment.

It was discovered that the placement of a movable field stop (i.e. framing window) FW having a fixed size aperture within the lens system controls the margin in the intermediate zooming positions (see FIG. 2). Margin represents the percentage of the FOV of the final photographic print that is seen through the finder. Margin control accommodates a variety of manufacturing and processing errors to assure that everything seen through the viewfinder will be contained in the final photograph. In this embodiment, a moving framing window FW was placed between a negative power unit UI and a negative movable optical unit UII.

Figure 3:
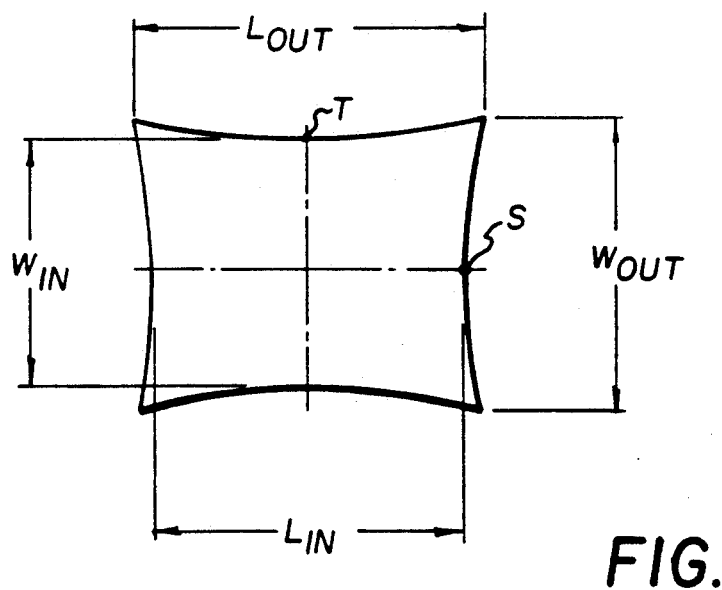
FIG. 3 shows the shape of the aperture (i.e. framing window) of the first embodiment.

The position of this moving field stop (or framing window) is chosen to be as far from the eye as possible to improve the sharpness of the edges of the field as defined by the aperture of the framing window FW. The moving framing window FW controls the field of view in all zoom positions to the desired 82% margin for the side of the format. The aperture shape of the framing window is illustrated in FIG. 3 and has a "pincushion shape" of the following dimensions:

$$W_{in}=4.452; W_{out}=4.778; L_{in}=6.910; L_{out}=7.200,$$

where W is the width and L is the length of the framing window aperture. Keeping the system distortion (of the lens system 100) throughout the zoom range of the same sign and similar in magnitude helps to keep the desired apparent window aperture shape (defining the rectangular field of view) the same through the zoom range. The lens system 100 has maximum absolute value of system distortion of from 2.4% to 2.9% distortion at the edge of the field. Having residual distortion is not necessary for the fixed size moving framing window concept to work. However, even when there is some system distortion present through the zoom range, matching the shape of the framing window aperture to the pupil distortion enables one to maintain a constant rectangular shape as seen by the eye (i.e. a constant rectangular object side FOV). Although the lens format determines the field of view and thus the basic size of the field stop (i.e. framing window) aperture, it is pupil distortion and system distortion that effects the shape of the framing window's aperture.

In a Reverse-Galilean viewfinder, the negative lens out front will typically introduce a positive (i.e. pin-cushion shape) pupil distortion and thus the aperture of the field stop (i.e. framing window aperture) will typically be of a pin-cushion shape. This is especially true if the system distortion amount is −3% to +3%. Positive system distortion will make the pin-cushion shape of the aperture of the framing window (also called framing window aperture) more pronounced, negative system distortion makes the pin-cushion shape of the aperture mask less pronounced. The function of the field mask is to simply delineate the field of view. The shape of the field stop aperture (i.e. framing window aperture) does not effect the system distortion. Since the overall optical system still has distortion, the viewing scene (buildings, etc.) may still appear distorted if the optical system has a large amount of distortion (i.e. >|4%|). However, the shape of the field stop aperture does effect the shape of the field. If the field stop aperture is rectangular and the optical system suffers from the pupil distortion, the viewer may not see the entire field of view.

For example, in the preferred embodiment, the front negative lens element introduces a positive pupil distortion. If the aperture of the framing window is rectangular shaped, it will cut out (i.e. vignette) the light coming through the corners, thus, darkening the edges of the field. Thus, we compensated for the pupil distortion (as measured from the eye) caused by the strong negative front element by allowing the entire field of view to be unvignetted. This is done by making the aperture of the field stop of a pin-cushion shape. Of course, in a different viewfinder system, a front element may be positive and thus may introduce a strong negative (i.e. barrel-shaped pupil distortion), thus necessitating a different shape field stop aperture. We arrived at the proper shape of the field stop aperture by following a procedure knowing the format size of the system and thus knowing the field of view:

A. Three extreme rays were traced through the system backward from the eye. These rays corresponded to the top, side and the corner field of view and were traced for the 3 zoom positions. First, the rays corresponding to the top T and the side S (see FIG. 3) of the format were traced. They were verified by their exiting angles (which must equal to the top and side half field of view) as the proper field rays. It was also verified that the two extreme top and side rays intersected the surface corresponding to the framing window at the same location along the optical axis. These intersections correspond to the framing window's aperture at mid-top and mid-side points. Next, a three-dimensional ray trace of the corner ray was done. The ray was traced from the corner of the eye pupil at an angle determined by the format of the FOV of the camera. When the corner ray emerged out of the optical system, the horizontal and vertical components of the angle of the emerging ray should be the same as for the top and the side rays. If these components do not match the exiting angles for the top and the side rays, the slightly different ray has to be traced again. This iterative process has to be repeated until the corner ray components substantially match those of the top and side ray.

B. The coordinates of the corner ray at the framing window location should then be determined. The coordinates define the location of the corners for the field mask.

C. Once the location of the framing window's mid-top, mid-side and corner coordinates are known, we can connect them (by assuming that a circle defines the curve that connects them together).

D. In a non-zooming viewfinder, or in a viewfinder system that has little distortion (as shown in a preferred embodiment), this procedure defines the shape of the aperture of the framing window. In a zooming viewfinder that has a wide range of system distortion, one may have to take the average coordinates (for the top, corner and the side rays) from the two extreme zoom positions and use them to define the (field stop) shape of framing window aperture.

FIG. 2 shows the margin for the side of the format in lens system 100 assuming only the moving field stop aperture (or framing window aperture) determines the FOV. The top and bottom margin is also precisely controlled. Thus, for lens system 100, the entire apparent field of view is precisely controlled by moving a framing window having a fixed size aperture.

Although in the preferred embodiment each optical unit corresponds to a single lens element or lens component, in a modification one may split one or more of these lens components into two or more optical elements or components.

Finally, although each of the lens elements in the preferred embodiment was made of plastic, in a modification one may design the viewfinder with one or more glass lens elements.

The invention has been described in detail with particular reference to a preferred embodiment thereof, but it will be understood that variations and modifications can be effected within the spirit and scope of the invention.

I claim:

1. A zoom finder comprising four lens units as follows:
    (a) a stationary first lens unit having negative refractive power;
    (b) a movable second lens unit having negative refractive power;
    (c) a movable third lens unit having positive refractive power;
    (d) a stationary fourth lens unit having negative refractive power, said second and third units being movable for zooming; and
    (e) a movable field stop, or framing window, said field stop or framing window having a fixed size aperture and located within said zoom finder between two lens units.

2. A zoom finder comprising in order from an object side, a stationary first lens unit having negative refractive power, and a field stop or a framing window having an aperture of a fixed size, a movable second lens unit having negative refractive power, a movable third lens unit having positive refractive power and a stationary fourth lens unit having negative refractive power, said second and third units being differentially movable for zooming and said field stop being movable for control of the apparent FOV.

3. A zoom finder according to claim 1, wherein each lens of said first, second, third, and fourth lens units consists of a respective lens element and each respective lens element is made of a plastic material.

4. A zoom finder comprising:
   four lens units arranged in order from an object side, said lens units cooperating to form an image of the object but introducing distortion about the periphery of the image, said four lens units including:
   (a) a stationary first lens unit having negative refractive power;
   (b) a movable second lens unit having negative refractive power;
   (c) a movable third lens unit having positive refractive power;
   (d) a stationary fourth lens unit having negative refractive power, said second and third units being movable for zooming; and
   a movable field stop or framing window, said field stop or framing window having a fixed size aperture and located within said zoom finder between two of said lens units, wherein the distortion is matched through the zoom range to said aperture of said movable field stop so as to maintain a constant rectangular object side field of view.

5. A zoom finder comprising four lens units arranged in order from an object side as follows:
   (a) a stationary first lens unit having negative refractive power;
   (b) a movable second lens unit having negative refractive power;
   (c) a movable third lens unit having positive refractive power;
   (d) a stationary fourth lens unit having negative refractive power, said second and third units being movable for zooming; and
   (e) a movable field stop or framing window, said field stop or framing window having a fixed size aperture and located within said zoom finder between two of said lens units, wherein said field stop or framing window has a pin-cushion shaped aperture.

6. A zoom viewfinder having an optical system comprising a plurality of lens elements at least one of which is movable during zooming and a fixed aperture framing window that is movable relative to all lens elements of the viewfinder during zooming.

7. A zoom finder according to claim 1 comprising the following design parameters:

| Surface | Clear Aperatures | | Radius | Thickness | Material | |
|---|---|---|---|---|---|---|
| | Top-Bottom | Side-Side | | | N | Y |
| S1 | 8.64 | 12.59 | 469.668 | 1.500 | 1.492 | 574 |
| S2 | 6.90 | 10.08 | ASPHERE | A″ | | |
| S3 | | | WINDOW | B″ | | |
| S4 | 4.74 | 7.22 | ASPHERE | 1.700 | 1.535 | 405 |
| S5 | 5.37 | 8.22 | −13.6721 | C″ | | |
| S6 | 6.67 | 10.38 | 12.4215 | 4.380 | 1.492 | 574 |
| S7 | 6.51 | 10.15 | ASPHERE | D″ | | |
| S8 | 3.00 | 4.61 | −121.781 | 1.200 | 1.535 | 405 |
| S9 | 2.94 | 4.25 | 22.0597 | | | |

FINDER LENGTH = 32.000

ASPHERIC EQUATION:

$$X = \frac{CY^2}{1 + \sqrt{1 - (k+1)C^2Y^2}} + DY^4 + EY^6 + FY^8 + GY^{10}$$

SURFACE S2
C = .14761      E = .12428E-05
k = −.87442     F = −.12197E-07
D = −.20684E-03  G = .84344E-10

SURFACE S4
C = −.16584     E = .45545E-05
k = −1.57580    F = .69169E-07
D = −.72436E-03  G = .15309E-10

SURFACE S7
C = −.07622     E = .11410E-05
k = −2.67459    F = −.14805E-07
D = .13448E-03   G = .57856E-10

| | ZOOM THICKNESSES: | | | |
|---|---|---|---|---|
| MAG. | A″ | B″ | C″ | D″ |
| .286 | 11.454 | 6.432 | 4.834 | 0.500 |
| .389 | 7.147 | 5.541 | 4.435 | 6.097 |
| .530 | 4.026 | 2.500 | 4.962 | 11.732 |

\* \* \* \* \*